May 9, 1967 R. R. SISLER 3,317,974
CLAMP
Filed May 3, 1965
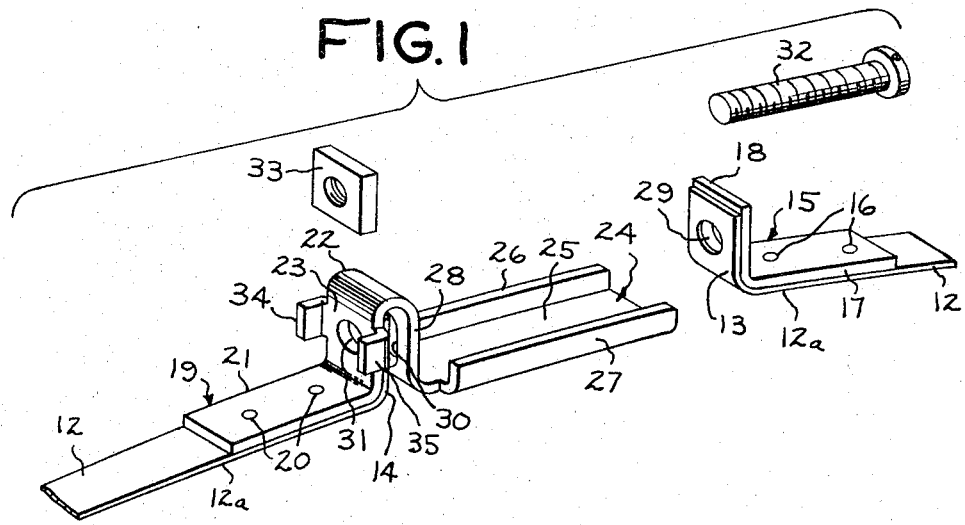
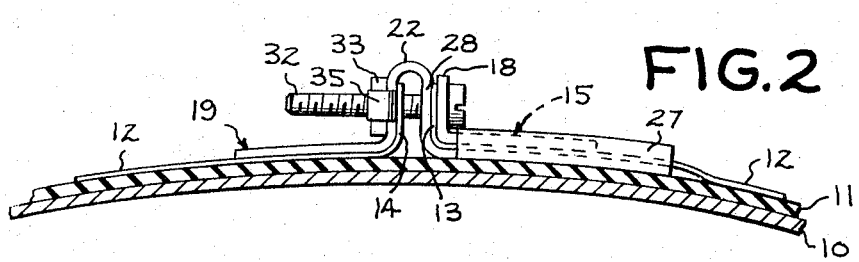
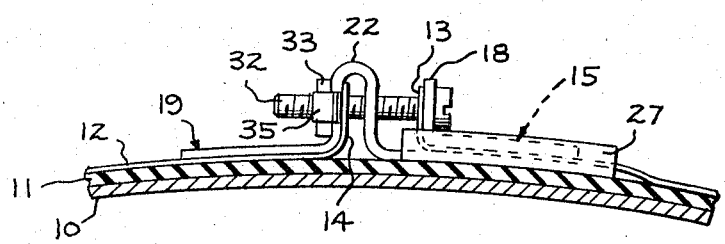
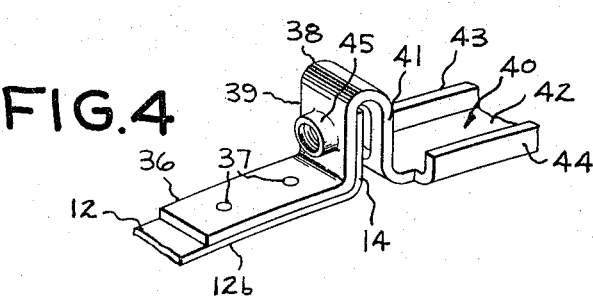
INVENTOR.
ROBERT R. SISLER
BY
HIS ATTORNEY

United States Patent Office 3,317,974
Patented May 9, 1967

3,317,974
CLAMP
Robert R. Sisler, Louisville, Ky., assignor to General Electric Company, a corporation of New York
Filed May 3, 1965, Ser. No. 452,671
1 Claim. (Cl. 24—279)

This invention relates generally to a new and improved clamp, and more particularly, to a new and improved clamp of the flexible band type adapted to securing together a pair of telescopically connected members such as, for example, a hose and a tubular connector or pipe.

In order to obtain a tight joint between a pair of telescopically connected members such as a hose and tubular connector it is necessary to tightly fasten some type of clamp around the outer member. Such clamps are usually tightened by use of some type of screw threaded mechanism. However, as the screw mechanism is drawn tight, the torque transmitted to the band tends to cause the band to roll over on itself. This rolling or twisting torque is greatest on the nut portion of the band. Also, in installations which must be corrosion resistant, twisting or rolling is a particularly acute problem because threaded elements made from corrosion resistant materials such as stainless steel tend to bind when tightened.

It is an object of this invention to provide a new and improved flexible band clamp.

It is another object of this invention to provide such a clamp which is particularly resistant to rolling or twisting.

It is a further object of this invention to provide such a clamp which may be inexpensive in construction and still be failure proof when assembled.

In carrying out my invention, in one form thereof, I provide a flexible band having an outwardly projecting tab formed at each end thereof. I include a first reinforcing member attached to the band adjacent the first end thereof and having a portion contiguous with the outer surface of the first tab. I also include a second reinforcing member attached to the band adjacent the other end thereof and having an outwardly projecting, return bent portion. The inner leg of the return bent portion is contiguous with the outer surface of the second tab. The second reinforcing member also has a channel portion which extends endwise of the second end of the band to receive the first end thereof. I also provide apertures through the tabs and return bent portion to receive a band tightening bolt. The inner leg of the return bent portion is provided with a pair of spaced tabs to receive a nut for cooperation with a bolt.

The subject matter which forms my invention is particularly pointed out and distinctly claimed in the concluding portion of this specification. The invention itself, however, both as to organization and method of operation together with further objects and advantages, may best be understood by reference to the following description taken in conjunction with the accompanying drawing.

In the drawing, FIGURE 1 is a partial, exploded, perspective view of one embodiment of my invention;

FIGURE 2 is a partial side view of the clamp of FIGURE 1 in assembled position;

FIGURE 3 is a view similar to FIGURE 2, showing the clamp in partially assembled position; and FIGURE 4 is a partial, perspective view of another embodiment of my invention.

Referring now to the drawing, particularly FIGURES 1–3, there is shown a new and improved clamp for securing together a pair of telescopically connected members such as 10 and 11. Such members may be a hose and a tubular connector or any one of a number of other pairs of elements. Normally, the two elements are cylindrical in shape although they may have other shapes. The outer member is quite often flexible, being made of material such as rubber or plastic. The clamp includes a flexible band 12 which may be bent to form a circular clamping band fitting closely around the outer surface of member 11. The ends 12a and 12b of the band are bent outwardly to form tabs 13 and 14. The tabs 13 and 14 extend radially outwardly from the main body of band 12 when the band is in assembled position, as shown in FIGURE 2.

A first, generally L-shaped reinforcing member 15 is attached to the band 12 adjacent the end 12a by suitable means such as the welds indicated at 16. The reinforcing member 15 includes a first portion 17 which is contiguous with the main body of band 12 and an outwardly projecting portion 18 which is contiguous with the outer surface of tab 13. Thus, reinforcing member 15 substantially stiffens end 12a of band 12.

A second reinforcing member 19 is provided adjacent the end 12b of the band 12. Reinforcing member 19 is attached to band 12 by suitable means such as welds 20 and includes a first portion 21 which is contiguous with the main body of band 12 and a return bent portion 22 which projects radially outward from the band. The inner leg 23 of return bent portion 22 is contiguous with the outer surface of tab 14, thus reinforcing member 19 substantially stiffens end 12b. A channel portion 24, including a base 25 and outwardly extending side walls 26 and 27, extends endwise of band 12 from the outer leg 28 of return bent portion 22 so as to extend circumferentially of members 10 and 11 when the band is in its assembled position.

In order to secure together the ends of band 12 and to tighten the band around the outer circumference of member 11 an aperture in the form of opening 29 is provided in tab 13 and projecting portion 18 of reinforcing member 15 in alignment with an opening 30 in outer leg 28 of return bent portion 22 and an opening 31 in inner leg 23 and tab 14. A tightening bolt 32 is passed through the openings 29, 30 and 31 and is threadedly received in a nut 33. In order to securely hold the nut 33 against turning during the fastening operation inner leg 23 is provided with a pair of spaced tabs 34 and 35 which project from opposite sides of inner leg 23 back along the main body of band 12.

In order to assemble the clamp around members 10 and 11 the body of the clamp is passed around the outer surface of member 11 and the first end 12a is inserted in channel member 25. Then bolt 32 is passed through apertures 29, 30 and 31 and threadedly received in nut 33, which has been placed between tabs 34 and 35. Then any suitable member, such as a screw driver, may be used to tighten the nut and bolt and thus draw the two ends of the band securely together, as shown in FIGURE 2. The side walls 26 and 27 of channel member 24 keep the two ends of band 12 aligned and prevent them from canting with respect to each other.

As bolt 32 and nut 33 are tightened, a twisting force is applied to the band which tends to cause the band to roll over. This force is transmitted to the band primarily through the nut 33 to reinforcing member 19. Because reinforcing band 19 is attached to the end 12b, end 12b must roll over if reinforcing band 19 rolls over. Since end 12a and reinforcing member 15 are supported in channel portion 24 it also is necessary for first end 12a to roll over with reinforcing member 19 if roll over or twisting is to occur. The tighter bolt 32 and nut 33 are drawn the greater becomes the twisting movement exerted on reinforcing member 19; however, the tighter the nut and bolt are drawn the more securely end 12a is held in channel portion 24 and against outer leg 28 of return bent portion 22. Thus, my new and improved clamp provides greater initial resistance to twisting and automatically increases the resistance as a greater twisting movement is placed upon the band. This enables the band to be drawn securely about the outer surface of member 11.

In many applications of flexible clamping members it is necessary that the clamp be constructed from corrosion resistant material. This increases the cost of the materials. If the reinforcing structures provided at the ends of the band must be constructed from the same high quality corrosion resistant material as the band itself, the price is greatly increased because of the greater thickness of the reinforcing members. With my new and improved clamp, reinforcing members 15 and 19 may be constructed of material which is substantially less corrosion resistant than flexible band 12, thus decreasing the cost of the total structure. This is so because reinforcing members 15 and 19 are provided to prevent canting of the ends of band 12 and roll over or twisting of the band during assembly and, once assembly is complete their function has been completed. After the assembly is complete the outwardly projecting tabs 13 and 14 are securely held by bolt 32 and nut 33 and no detrimental effect results if reinforcing members 15 and 19 corrode. This is true even though return bent portion 22 should corrode completely through.

Referring now to FIGURE 4 there is shown therein another form of my new and improved clamp in which a reinforcing member 36 is attached to end 12b of clamp 12 in place of reinforcing member 19. Reinforcing member 36 is secured to the body of band 12 by welds 37 and includes a return bent portion 38 having an inner leg 39 contiguous with the outer surface of projecting tab 14. A channel member 40 projects endwise of band 12 from outer leg 41 of return bent portion 38 and includes a base portion 42 and side walls 43 and 44. As it readily can be seen, the construction and functioning of reinforcing member 36 is substantially the same as reinforcing member 19 except for the manner in which tightening bolt 32 is secured. In this regard, rather than an opening through the inner leg of the reinforcing member and a pair of spaced tabs to receive a nut, inner leg 39 of reinforcing member 38 is provided with an extruded portion 45 which is threaded to receive the tightening bolt 32. Thus, with the form of clamp shown in FIGURE 4 the tightening bolt is received directly in the reinforcing member rather than being received in a nut held by the reinforcing member.

While in accordance with the patent statutes, I have described what at present is considered to be the preferred embodiment of my invention, it will be obvious to those skilled in the art that various changes and modifications may be made therein without departing from the invention, and I therefore aim in the appended claim to cover all such changes and modifications as fall within the true spirit and scope of my invention.

What I claim as new and desire to secure by Letters Patent of the United States is:

In a clamp, a flexible band, each end of said band being formed as a radially outwardly projecting tab, a first reinforcing member attached to said band adjacent the first end and including a portion contiguous with the outer surface of the first of said tabs, a second reinforcing member attached to said band adjacent the other end thereof, said second reinforcing member including a return bent portion extending radially outward from said band, the inner leg of said return bent portion being contiguous with the outer surface of said second tab, said second reinforcing member further including a channel portion extending endwise of said other end of said band to receive said first end of said band, said tabs, said projecting portion of said first reinforcing member and the outer leg of said return bent portion of said second reinforcing member being apertured to receive a tightening bolt, and said inner leg of said return bent portion being provided with a threaded opening to engage the bolt.

References Cited by the Examiner

UNITED STATES PATENTS

| 1,155,646 | 10/1915 | D'Arcy | 24—286 |
|---|---|---|---|
| 1,559,049 | 10/1925 | Rutledge. | |
| 1,635,783 | 7/1927 | Goodall | 24—284 |
| 1,830,558 | 11/1931 | Olson. | |

FOREIGN PATENTS

| 497,718 | 9/1919 | France. |
|---|---|---|
| 20,723 | 10/1929 | Netherlands. |

JAMES L. JONES, Jr., *Primary Examiner.*